United States Patent
So

[19]

[11] Patent Number: 5,550,644
[45] Date of Patent: Aug. 27, 1996

[54] VIDEO CASSETTE RECORDER CAPABLE OF AUTOMATICALLY SETTING A TELEVISION RECEIVER

[75] Inventor: Myung-Kook So, Incheon, Rep. of Korea

[73] Assignee: Daewoo Electronics Co., Ltd., Seoul, Rep. of Korea

[21] Appl. No.: 362,108

[22] Filed: Dec. 22, 1994

[30] Foreign Application Priority Data

Dec. 22, 1993 [KR] Rep. of Korea .................. 93-29137

[51] Int. Cl.$^6$ ................. H04N 5/76; H04N 5/78
[52] U.S. Cl. ................. 358/335; 360/33.1; H04N/5/76; H04N/5/78
[58] Field of Search ................. 358/335, 342, 358/310, 311, 341, 343; 360/32, 33.1, 13, 14.1, 27, 79, 19.1; 348/731, 734

[56] References Cited

U.S. PATENT DOCUMENTS 3,994,019 11/1976 Sajishima et al. .................. 360/33
5,109,284 4/1992 Jung .................. 358/335
5,291,343 3/1994 Goto .................. 360/33.1

*Primary Examiner*—Tommy P. Chin
*Assistant Examiner*—Robert Chevalier
*Attorney, Agent, or Firm*—Anderson Kill Olick & Oshinsky, P.C.

[57] ABSTRACT

A video cassette recorder ("VCR"), which is capable of automatically setting a television ("TV") receiver when the VCR is in a playback mode, comprises an A/V (audio/video) line connection detector for detecting whether the A/V signal output terminal of the VCR is connected to the TV receiver; a RF (radio frequency) channel detector for detecting a carrier frequency of a RF signal; a memory for storing power-on, power-off, TV mode, A/V mode, channel 3 and channel 4 key codes; a microprocessor coupled to the A/V line connection detector and the RF channel detector for reading a key code from the memory to thereby provide the key code; and an IR signal transmitter for transmitting an IR signal carrying the the key code to an IR signal receiver of the TV receiver.

2 Claims, 4 Drawing Sheets

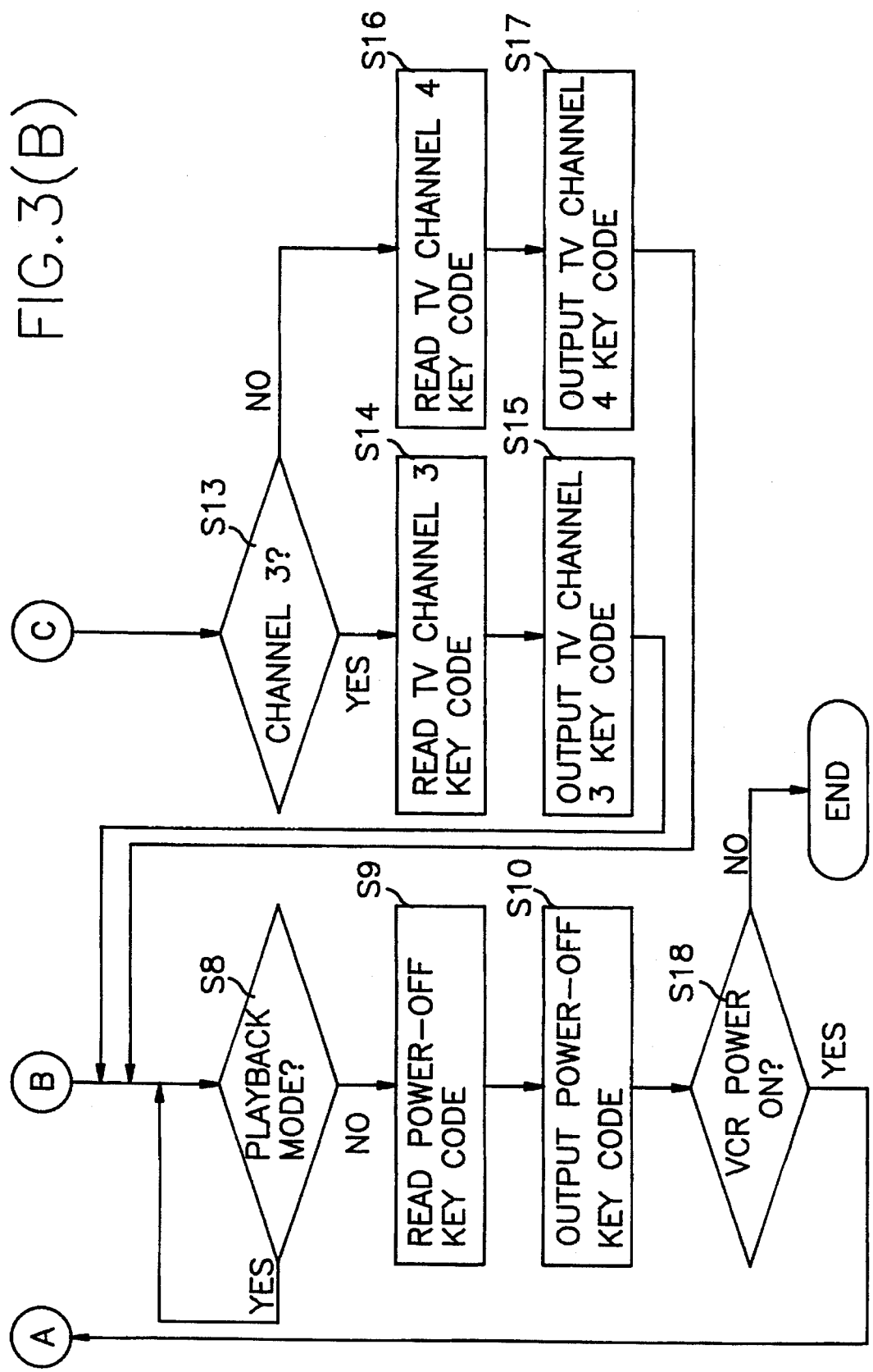

5,550,644

VIDEO CASSETTE RECORDER CAPABLE OF AUTOMATICALLY SETTING A TELEVISION RECEIVER

FIELD OF THE INVENTION

The present invention relates to a video cassette recorder; and, more particularly, to a video cassette recorder capable of automatically controlling a television receiver during a playback of a recorded program.

BACKGROUND OF THE INVENTION

A reproduced signal for a recorded program played back on a video cassette recorder ("VCR") is outputted through one of two output terminals thereon connected to a television ("TV") receiver, one being a RF (radio frequency) signal output terminal for providing a RF signal having a channel 3 or 4 modulation frequency and the other being an A/V (audio/video) signal output terminal for providing an A/V signal without having a modulation frequency.

Accordingly, in order to watch the recorded program played back from the VCR, the TV receiver must be turned on and an appopriate output terminal, through which the reproduced signal is sent to the TV receiver, must be selected, from either the A/V or the RF signal output terminal of the VCR.

In other words, in order to watch the recorded program using a conventional VCR, it is necessary to operate both the VCR and the TV receiver.

SUMMARY OF THE INVENTION

It is, therefore, a primary object of the present invention to provide a VCR capable of turning on a TV receiver automatically and setting a receiving channel thereof to thereby provide an automatic viewing of the recorded program.

In accordance with the present invention, there is provided a VCR for automatically setting a TV receiver when the VCR is in a playback mode, wherein the VCR includes a RF signal output terminal for transmitting a RF signal having a channel 3 or 4 carrier frequency program and an A/V signal output terminal for transmitting an A/V signal; and the TV receiver includes an infrared signal receiver, the TV receiver being responsive to power-on, power-off, TV mode, A/V mode, channel 3 and channel 4 key codes transmitted through the infrared signal receiver thereby performing respective functions corresponding to the key codes, comprising: first detection means for determining whether the A/V signal output terminal is connected to the TV receiver to thereby generate a first connection signal if the A/V signal output terminal is connected to the TV receiver and a second connection signal, if otherwise; second detection means for detecting a carrier frequency of the RF signal to thereby provide a first frequency detection signal if the RF signal has the channel 3 carrier frequency and provide a second frequency detection signal if the RF signal has the channel 4 carrier frequency; means for storing the power-on, power-off, TV mode, A/V mode, channel 3 and channel 4 key codes; microprocessor means for providing from the storage means the power-on key code if the video cassette recorder is in the playback mode, the A/V mode key code if the first connection signal is applied thereto, the TV mode and the channel 3 key codes if the second connection signal and the first frequency detection signal are fed thereto, the TV mode and the channel 4 key codes in response to the second connection signal and the second frequency signal, and power-off key code if the VCR is not in the playback mode; and infrared signal transmitting means in response to the key codes provided from the microprocessor means for generating and transmitting infrared signals representing the key codes to the infrared signal receiver of the TV receiver.

BRIEF DESCRIPTION OF THE DRAWINGS

The above and other objects and features of the present invention will become apparent from the following description of the preferred embodiments taken in conjunction with the accompanying drawings; in which.

DETAILED DESCRIPTION OF THE PREFERRED EMBODIMENT

Figure 1:
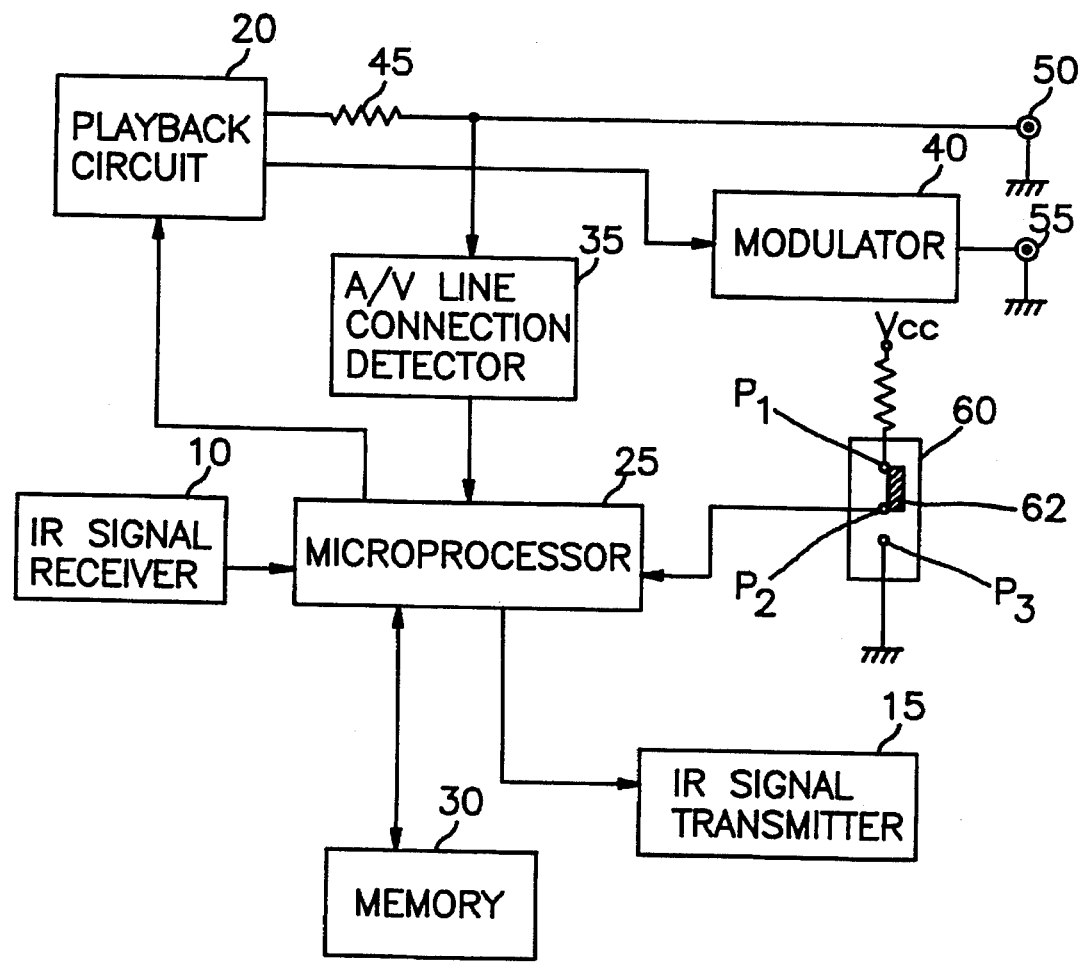
FIG. 1 shows a schematic block diagram of a VCR capable of automatically setting a TV receiver in accordance with the present invention.

FIG. 1 shows a schematic block diagram of the VCR capable of automatically turning a TV receiver on and off and setting a receiving channel thereof during a playback of a recorded program. The TV receiver includes a infrared ("IR") signal receiver and is responsive to various key codes transmitted through the IR signal receiver thereon, thereby performing respective functions corresponding to the transmitted key codes.

When a playback start signal issued from a remote controller (not shown) is received by a IR signal receiver 10 of the VCR or a video cassette is inserted into a VCR deck (not shown), a microprocessor 25 provides a playback command signal to a playback circuit 20 to thereby set the VCR in a playback mode. Thereafter, the microprocessor 25 reads a power-on key code from a memory 30, e.g., made of a EEPROM (Electrically Erasable Programmable Read Only Memory) containing various, e.g., power-on, power-off, TV mode, A/V mode, channel 3 and channel 4, key codes for controlling the TV receiver. Subsequently, the microprocessor 25 outputs the power-on key code to a IR signal transmitter 15, which, in turn, transmits the power-on key code to a IR signal receiver of the TV receiver (not shown) as an IR signal, thereby turning the TV receiver on. The IR signal transmitter 15 is capable of providing the TV receiver with the power-on, power-off, A/V mode, TV mode, channel 3, or channel 4 key code to the IR signal receiver of the TV receiver as an IR signal for carrying a respective key code information under the control of the microprocessor 25.

Thereafter, the playback circuit 20 starts the playback of the recorded program and transmits a reproduced signal, in a form of an A/V signal, to an A/V signal output terminal 50 via a resistor 45 which determines an output impedance of the terminal 50. The playback circuit 20 also transmits the reproduced signal to a modulator 40 which converts the reproduced signal into a RF signal having the channel 3 or 4 carrier frequency depending on the setting of a RF channel selector (not shown). The RF signal from the modulator 40 is applied to a RF signal output terminal 55.

In the meantime, an A/V line connection detector 35, which is connected to a line between the resistor 45 and the A/V signal output terminal 50, detects whether the A/V signal output terminal of the VCR is connected to an A/V signal input terminal of the TV receiver (not shown). Specifically, if the A/V signal output terminal 50 of the VCR is not connected to the A/V signal input terminal of the TV receiver, a maximum peak-to-peak voltage of the reproduced signal is about 2 $V_{p-p}$(peak-to-peak voltage).

On the other hand, if the A/V signal output terminal 50 is connected to the A/V signal input terminal, the voltage level of the reproduced signal is about 1 $V_{p-p}$. The voltage level of the reproduced signal, however, can be varied within the range of the maximum peak-to-peak voltage, while the voltage level of a synchronization (SYNC) signal included in the reproduced signal is fixed to a certain value; and, accordingly, in the preferred embodiment of the present invention, the A/V line connection detector 35 extracts the SYNC signal from the reproduced signal and clamps the SYNC signal. The clamped SYNC signal is, then, compared with a reference level. For instance, if the clamped SYNC signal is about 0.3 $V_{p-p}$ when the A/V signal output terminal 50 is connected to the A/V input terminal of the TV receiver, and about 0.6 $V_{p-p}$, when the A/V signal output terminal is not connected to the A/V signal input terminal, the reference level can be chosen to be 0.4 V. If the voltage level of the clamped SYNC signal is less then the reference level, the A/V line connection detector 35 provides a logic "1" signal to the microprocessor 25 and "0", if the voltage level of the clamped SYNC signal is greater the reference level.

When the microprocessor 25 receives the logic "1" signal from the A/V line connection detector 35, the microprocessor 25 reads an A/V mode key code from the memory 30 and provides the same to the IR signal transmitter 15. Then the IR signal transmitter 15 transmits the A/V mode key code to the IR signal receiver of the TV receiver as an IR signal, thereby causing the TV receiver to be in the A/V mode and enabling the reproduced signal from the playback circuit 20 to be displayed on the TV receiver through the A/V signal output terminal 50 of the VCR.

However, if the microprocessor 25 receives the logic "0" signal from the A/V line connection detector 35, which implies that the A/V signal output terminal 50 is not connected to the TV receiver, the microprocessor 25 reads the TV mode key code from the memory 30 and transmits the same to the IR signal transmitter 15, thereby setting the TV receiver to a TV mode for accepting the reproduced signal from the VCR through the RF signal output terminal 55. Subsequently, the microprocessor 25 checks whether a detection signal from a RF channel detector 60 is logic high or logic low. The RF channel detector 60 detects a setting position of the RF channel selector included in the VCR (not shown). Specifically, the RF channel detector 60 comprises a first contact P1, a second contact P2, a third contact P3 and a slide member 62, wherein the first contact P1 is connected to a power source (Vcc); the second contact P2, to the microprocessor 25; the third contact P3, to ground; and the slide member 62 slides, in unison with the setting position of the RF channel selector, between the first and second contacts P1,P2 and second and third contacts P2,P3.

In case the slide member 62 is positioned between the second and third contacts P2,P3, the RF channel detector 60 provides a logic "0" signal to the microprocessor 25. On the other hand, when the slide member 62 is positioned between the first and second contacts P1,P2, the RF channel detector 60 provides a logic "1" signal to the microprocessor 25. If the RF channel detector 60 issues the logic "0" signal, the microprocessor 25 reads, e.g., the channel 4 key code from the memory 30 and transmits the same to the IR signal receiver of the TV receiver via the IR signal transmitter 15. On the other hand, if the logic "1" signal is issued by the RF channel detector 60, the microprocessor 25 reads, e.g., the channel 3 key code from the memory 30 and transmits the same to the IR signal receiver of the TV receiver via the IR signal transmitter 15. Thereafter, the microprocessor 25 continuously checks whether the VCR is in the playback mode. If the VCR is not in the playback mode, the microprocessor 25 reads the power-off key codes from the memory 30 and transmits the same to the TV receiver via the IR signal transmitter 15 in order to turn off the TV receiver.

Figure 2:
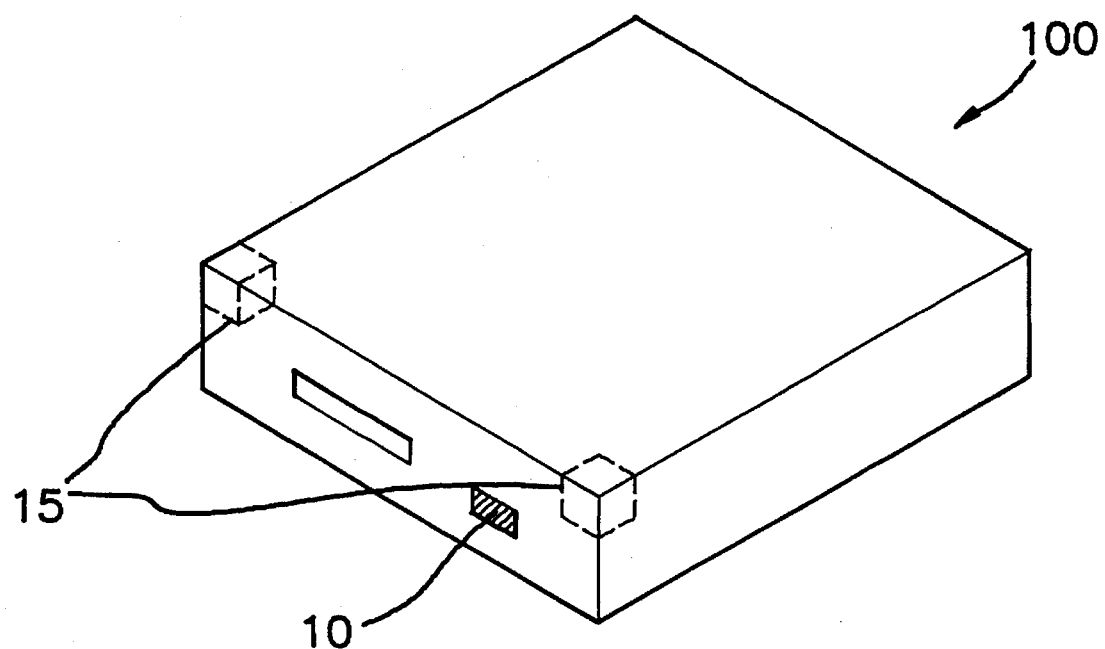
FIG. 2 shows a perspective view of the VCR in accordance with the present invention; and, FIG. 3 (A) and FIG. 3 (B) show a flow chart illustrating a procedure for setting the TV receiver.

Referring to FIG. 2, there is shown a perspective view of the VCR 100 provided with the IR signal receiver 10 and one or more, e.g., two IR signal transmitters 15 in accordance with the present invention, each of which is mounted on each of the two upper front corners of the VCR 100. However, the location of the IR signal transmitters 15 can be varied depending on the receptability of the IR signal at the IR signal receiver located on the TV receiver (not shown). That is, the IR signal transmitters 15 can be made to be detachable from the VCR 100 but coupled thereto through connection lines; and positioned at appropriate locations in order for the IR signal receiver of the TV receiver to receive the IR signal from the IR signal transmitter 15.

Figure 3A:
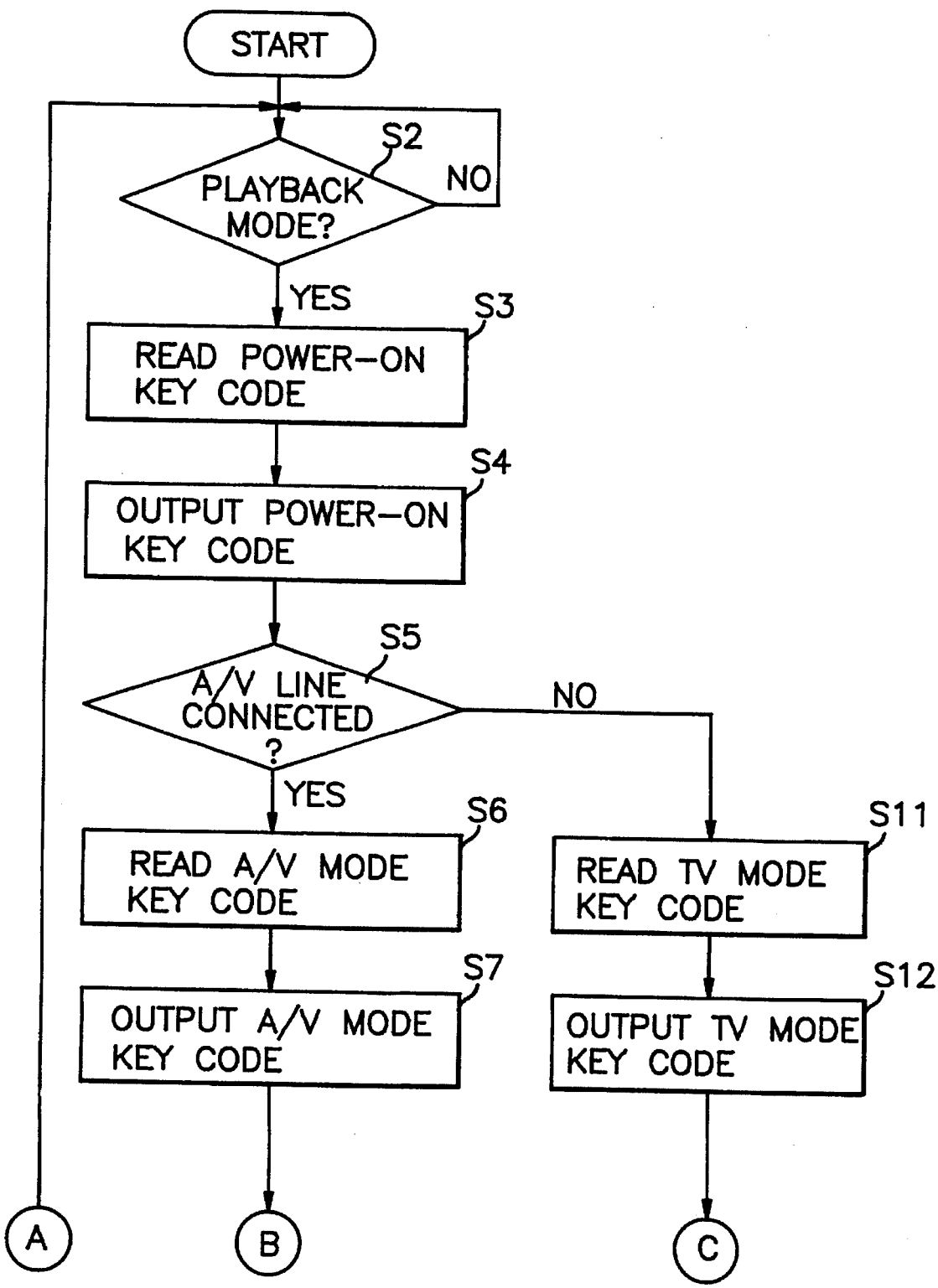

Referring now to FIG. 3(A) and FIG. 3(B), there is provided a flow chart describing the procedure for setting the TV receiver in accordance with the preferred embodiment of the present invention.

In step S2, the microprocessor 25 determines whether the VCR 100 is in the playback mode. If the VCR is not in the playback mode, the procedure goes back to step S2; and if the VCR is in the playback mode, the microprocessor 25 reads the power-on key code from the memory 30 in step S3. Thereafter, in step S4, the microprocessor 25 outputs the power-on key code to the TV receiver via the IR signal transmitter 15. Subsequently, in step S5, it is determined whether the A/V signal output terminal 50 of the VCR 100 is connected to the TV receiver. If connected, the process proceeds to step S6. In step S6, the microprocessor 25 reads the A/V mode key code of the TV receiver from the memory 30 and outputs, in step S7, the same to the TV receiver via the IR signal transmitter 15. Thereafter, the process goes to step S8.

If the A/V signal output terminal 50 is determined not being connected to the TV receiver in step S5, the process goes to step S11. In step S11, the TV mode key code for the TV receiver is read by the microprocessor 25 and outputted to the TV receiver via the IR signal transmitter 15 in step S12. Thereafter, in step S13, it is checked whether the RF channel detector 60 is set to the channel 3. If positive, the process goes to step S14. In step S14, the microprocessor 25 reads the channel 3 key code of the TV receiver from the memory 30 and in step S15, the channel 3 key code is outputted from the IR signal transmitter 15 to the TV receiver under the control of the microprocessor 25. Thereafter, the process goes to step S8.

If it is determined that the RF channel detector 60 is set to the channel 4 in step S13, the process goes to step S16. In step S16, the microprocessor 25 reads the channel 4 key code of the TV receiver from the memory 30 and in step S17, the microprocessor 25 provides the channel 4 key code to the TV receiver through the IR signal transmitter 15. Subsequently, the process goes to step S8.

In step S8, the microprocessor 25 checks the current mode of the VCR and determine whether the VCR is in the playback mode. If the VCR is in the playback mode, the process goes back to step S8; otherwise, the process proceeds to step S9. In step S9, the microprocessor 25 reads the power-off key code from the memory 30, and in step S10, the power-off key code is transmitted to the TV receiver, thereby causing the TV receiver to be turned off. Then, in step S18 it is checked whether the VCR power is on. If the VCR is in the turn-on state, the process goes back to step S2 and if the VCR power is off, the process is terminated.

While the present invention has been described with respect to certain embodiments only, other modifications and variations may be made without departing from the scope of the present invention as set forth in the following claims.

What is claimed is:

1. A video cassette recorder for automatically setting a television receiver when the video cassette recorder is in a playback mode, wherein the video cassette recorder includes a radio frequency signal output terminal for transmitting a radio frequency signal having a channel 3 or 4 carrier frequency program and an audio/video signal output terminal for transmitting an audio/video signal; and the television receiver includes an infrared signal receiver, the television receiver being responsive to power-on, power-off, television mode, audio/video mode, channel 3 and channel 4 key codes transmitted through the infrared signal receiver thereby performing respective functions corresponding to the key codes, comprising:

first detection means for determining whether the audio/video signal output terminal is connected to the television receiver to thereby generate a first connection signal if the audio/video signal output terminal is connected to the television receiver and a second connection signal, if otherwise;

second detection means for detecting the carrier frequency of the radio frequency signal to thereby provide a first frequency detection signal if the radio frequency signal has the channel 3 carrier frequency and provide a second frequency detection signal if the radio frequency signal has the channel 4 carrier frequency;

means for storing the power-on, power-off, television mode, audio/video mode, channel 3 and channel 4 key codes; and microprocessor means for providing from the storage means the power-on key code if the video cassette recorder is in the playback mode, the audio/video mode key code if the first connection signal is applied thereto, the television mode and the channel 3 key codes if the second connection signal and the first frequency detection signal are fed thereto, the television mode and the channel 4 key codes in response to the second connection signal and the second frequency signal, and the power-off key code if the video cassette recorder is not in the playback mode.

2. The video cassette recorder of claim 1, further comprising:

infrared signal transmitting means in response to the key codes provided from the microprocessor means for generating and transmitting infrared signals representing the key codes to the infrared signal receiver of the television receiver.

* * * * *